United States Patent [19]
Miller

[11] Patent Number: 5,193,937
[45] Date of Patent: Mar. 16, 1993

[54] SEABED STABILIZATION MATTRESSES

[75] Inventor: Keith E. J. Miller, Maidenhead, England

[73] Assignee: SeaMark Systems Limited, Broxburn, England

[21] Appl. No.: 720,774

[22] PCT Filed: Nov. 8, 1990

[86] PCT No.: PCT/GB90/01720

§ 371 Date: Jul. 18, 1991

§ 102(e) Date: Jul. 18, 1991

[87] PCT Pub. No.: WO91/07544

PCT Pub. Date: May 30, 1991

[30] Foreign Application Priority Data

Nov. 10, 1989 [GB] United Kingdom ............... 8925502

[51] Int. Cl.⁵ ........................................ F16L 1/12
[52] U.S. Cl. ............................ 405/157; 405/158; 405/172
[58] Field of Search ............... 405/19, 20, 154, 157, 405/158, 172

[56] References Cited

U.S. PATENT DOCUMENTS 4,166,710 9/1979 Spiridonov ..................... 405/172
4,469,469 9/1984 Kennedy ........................ 405/157

FOREIGN PATENT DOCUMENTS

| 0251389 | 1/1988 | European Pat. Off. . |
| 2039272 | 2/1972 | Fed. Rep. of Germany ...... 405/157 |
| 2296733 | 7/1976 | France . |
| 2432668 | 4/1980 | France ................................. 405/172 |
| 79/000108 | 3/1979 | PCT Int'l Appl. ................. 405/172 |
| 687300 | 9/1979 | U.S.S.R. .............................. 405/172 |
| 1463743 | 2/1977 | United Kingdom ................ 405/172 |
| 2065205 | 6/1981 | United Kingdom . |
| 8808500 | 11/1988 | World Int. Prop. O. . |
| 9001584 | 2/1990 | World Int. Prop. O. . |

Primary Examiner—David H. Corbin
Attorney, Agent, or Firm—Oblon, Spivak, McClelland, Maier & Neustadt

[57] ABSTRACT

A concrete or the like mattress for laying over a pipeline on the seabed comprises an elongate recess or tunnel (5) having an insulating material (6) located therein. The mattress is laid over a subsea pipeline so that the pipeline is received within the insulant-containing tunnel. The pipeline is thus physically protected and thermally insulated. The mattress can comprise a plurality of concrete or like members (1,2,2',3,3') articulated together.

9 Claims, 6 Drawing Sheets

SEABED STABILIZATION MATTRESSES

The present invention relates to seabed mattresses for the protection and stabilisation of seabed installations such as pipelines.

The use of mattresses, especially articulated mattresses, in offshore, coastal and marine engineering is well known for stabilisation, protection and scour prevention of pipelines, flowline umbilicals, seabed templates, steel and concrete platforms and the like. These mattresses are particularly useful in areas of high bottom current where hydrodynamic forces are considerable. Thus, for example, a seabed pipeline can be covered with such a mattress so that the pipeline is stabilised by the weight of the blanket thereon and also the adjacent seabed is protected against erosion. Examples of articulated mattresses and their use are given for example in European patent specification 152232A to which reference should be made for further details. Generally, these mattresses comprise concrete or similar elements joined together to allow relative articulation.

Subsea stabilisation mattresses can be relatively massive, eg. a mat of 5 m×2 m would weigh (in air) over 2.5 tonnes. However, even so, when they are laid over a seabed pipeline, for example, they can still be prone to movement during a storm or tidal surge. Whilst, in theory, greater stability could be obtained by increasing the mat weight, we have found another way of dealing with this problem.

Further, in addition to stability in extreme storm conditions, a stabilisation mattress should desirably also be capable of withstanding the impact thereon of anchors or trawlboards travelling laterally, or dropped objects travelling largely vertically.

We have shown an improved mattress design in our PCT application GB 8900931 from which U.S. Pat. No. 5,052,859 issued to the present inventor and was assigned to the same assignee, whereby an articulated mattress is formed from elements characterised in that the mattress has a relatively thick region from which its thickness tapers to at least one side edge.

A highly preferred feature of that invention is the provision of a recessed "tunnel" region in which a seabed pipeline is received and thus protected by the mattress. The tunnel is preferably dimensioned to allow lateral movement of the pipeline (but not upward buckling) to accommodate thermal expansion. In a further preferred feature of that invention, a heat insulation material can be introduced into the tunnel inside a container. The container is generally positioned within the tunnel recess prior to placement of the mattress, and the container is filled from an external source.

We have now found, in accordance with one aspect of the present invention, a new way of providing heat insulant material in a recessed tunnel region of a mattress (such as those mattresses of our above PCT application, or others). According to the present invention, the heat insulant is provided in the tunnel prior to deployment of the mattress, eg. it is provided during manufacture of the mattress or at some stage prior to emplacement of the mattress on a seabed pipeline or the like.

In one aspect, therefore, the invention provides a seabed stabilisation mattress which comprises at least one concrete or like member including a tunnel-like recess to receive a subsea pipeline or the like, wherein the mattress includes a heat-insulation material in the tunnel to insulate the said pipeline or the like when the mattress is laid thereover. Preferably, the mattress comprises a plurality of concrete or like members articulated together.

In a highly preferred embodiment of the invention, the insulant material is such that, when the mattress has been laid over a pipeline (or the like), it will soften or liquefy as it warms to the pipeline temperature. Materials such as waxes or bitumen are very suitable in that they will soften or liquefy close to the wall of the pipeline as it heats up due to the passage of contained hot fluids. This softening or liquefaction will minimise lateral resistance to any movement of the pipeline in the tunnel and allow the pipeline to take up a normal lateral expansion profile without the possibilities of catastrophic upheaval buckling and failure. The insulant material will reform within the recess after the lateral movement has taken place and the pipeline has changed location within the recess thus reinstating the thermal insulation. Materials other than waxes and bitumen may be used provided they have suitable properties. For example, certain thermoplastic resins are useful.

The insulation material need not be one which softens or liquefies in use. Instead, other materials may be used such as foams or other substances which preferably have some resilience to conform to the shape of the pipeline surface and so provide an insulating covering thereon. Non-resilient materials can be used but they are not generally preferred.

Additional insulation materials can be used to enhance the natural insulation of the concrete or other material making up the main elements of the mattress. Materials suitable for long term seawater environment, such as polyurethane with added glass microspheres, can be used.

Insulation values equivalent to those provided by the existing techniques, such as factory installed insulation coatings on pipelines, and soil or rock backfill around a pipeline can be achieved with the present invention.

The presence of the insulant material within the tunnel recess provides a number of advantages in addition to those above. For example, it allows the mattress to be lowered onto the pipeline with a much reduced chance of damage to any external corrosion coat on the pipeline wall. The insulant material in the tunnel can be shaped to act as a positioning element to ensure that the mattresses are laid precisely with respect to the pipeline. The recess would normally be central to the mattress such that the pipeline axis lies initially along the centre line of a row of adjacent mattresses.

A further preferred feature of the invention is that adjacent mattresses should interlock together to resist lateral movement.

During deployment and location of a mattress of the invention, a small "lens" of seawater will often be trapped between the mattress and the seafloor by the insulant material. In one preferred embodiment of the invention two differing types of insulant material are used, whereby one component of insulant material has a specific gravity greater than seawater such that on heating and liquefaction, this insulant flows to fill the volume occupied by the water lens and thereby surrounding the pipeline, the displaced seawater forming in the pockets away from the immediate vicinity of the pipeline. The removal of the seawater, which would normally be highly oxygenated and a necessary component of any corrosion reaction, from close proximity of the pipeline significantly reduces the corrosion protection requirements for the pipeline coating and cathodic protection systems. The other component insulant would have a specific gravity less than that of seawater.

Subsea pipelines which carry hot materials inevitably are subject to thermal expansion and contraction as temperatures vary. A major feature of the tunnel mattresses described in our above-mentioned PCT application GB 8900931 and herein is that the pipelines so protected can move laterally but are prevented from vertical buckling. In accordance with another aspect of the present invention, we have devised a new design of mattress which is particularly useful for protecting pipelines in a trench and for avoiding upheaval buckling failure.

In accordance with this aspect of the invention, the subsea mattress is of concrete or the like, and is in section of generally triangular shape, with the apex shaped to seat on a pipeline in a trench, with the sides of the mattress engaging the sides of the trench. Preferably, the mattress will comprise a plurality of members articulated together. Preferably, the mattress is of generally isosceles obtuse shape.

The trench provides the primary stabilisation of the pipeline against hydrodynamic forces induced from seabed currents and surface wave action. The trench also provides protection from trawlboard strike by lowering the pipeline below the seabed. Typical trenches are approximately 1 m deep and have a slope angle of 30°. The evacuated soil generally forms an additional spoil pile at the extreme edges of the trench, further enhancing the apparent depth.

Pipelines subject to considerable thermal expansion when placed in such trenches are subject to upheaval buckling, dependent on a number of critical parameters such as pressure and temperature of operation, overall length of line, local topography and presence of soil or rock dump backfill. Significant upheaval amplitudes have been experienced, including one actual failure. The present invention overcomes this problem by pinning the pipeline at discrete locations such that a mattress of this design or a number of such mattresses are placed at prescribed intervals along the pipeline.

The action of these individual mattresses or groups of mattresses is to "pin" the pipeline within the trench such that the frictional resistance created between the pipeline and the seabed inhibits axial movement of the pipeline at the mattress location. There is then no possibility of feedthrough of the thermal expansion from one element of the pipeline to another, this feed-through being a necessary causal mechanism of the upheaval buckling failure. The pipeline between each mattress location is allowed to move freely within the trench and will move up the trench wall by way of small scale local buckling to relieve the effect of the thermal expansion. The frequency of the mattress grouping will depend on such factors as the seabed friction co-efficient, trench geometry and pipeline temperature.

The shape of the apex of the triangular structure is designed to engage the pipeline along the whole mattress length so that the mattress load is translated to the pipeline evenly without local overstressing of the pipeline.

In order that the invention can be more fully understood, various embodiments thereof will now be described, by way of example only, with reference to the accompanying drawings, wherein.

Figure 1:
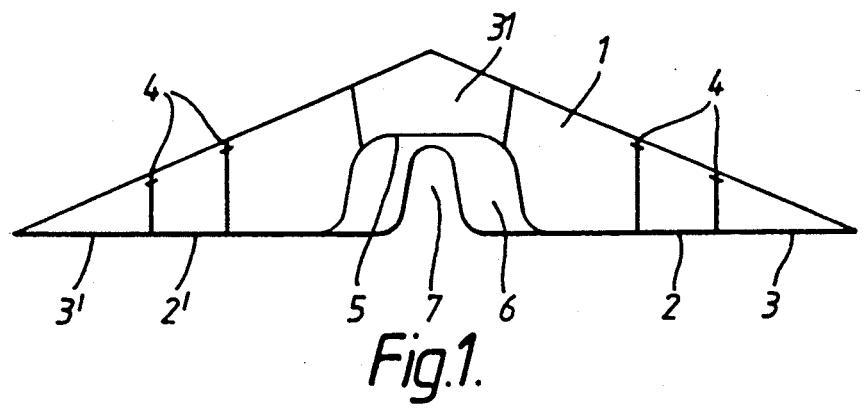
FIG. 1 is a schematic end view of a first embodiment of the mattress of the invention.

Referring to the drawings, the mattress of FIG. 1 comprises five elongate concrete members 1,2,2',3 and 3' lying side by side. The central member 1 is the thickest and the thickness tapers down via members 2/2' to the side member 3/3'. Ropes or cables 4 are embedded in the members to link them together and provide lifting or articulation points as described in applicant's U.S. Pat. No. 5,052,859. The central element 1 has a tunnel recess 5 extending the whole mattress length. Within this tunnel recess, a shaped block of insulant material 6 is formed during manufacture of the mattress. The block has a central recess 7 which provides the initial location for a seabed pipeline. The central element 1 has a projecting section 31 which allows mattress elements to interlock.

Figure 2:
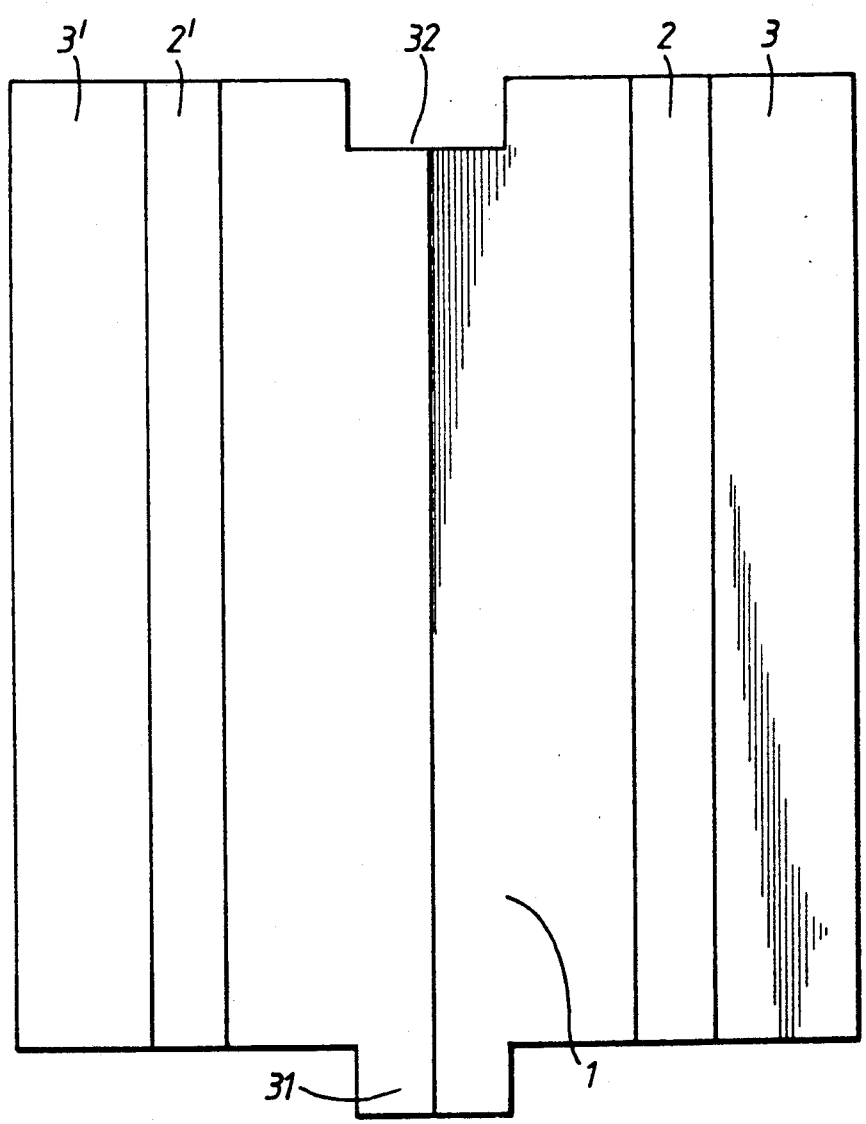
FIG. 2 is a top plan view of the mattress of FIG. 1.

FIG. 2 is a top plan view of the mattress of FIG. 1 and like numerals indicate like parts. A typical size of this mattress might be width 2 m, length 5 m and maximum thickness 0.5 m. The plan view shows the insert slot 32 which provides the interlocking location for joining the mattresses into rows.

Figure 3:
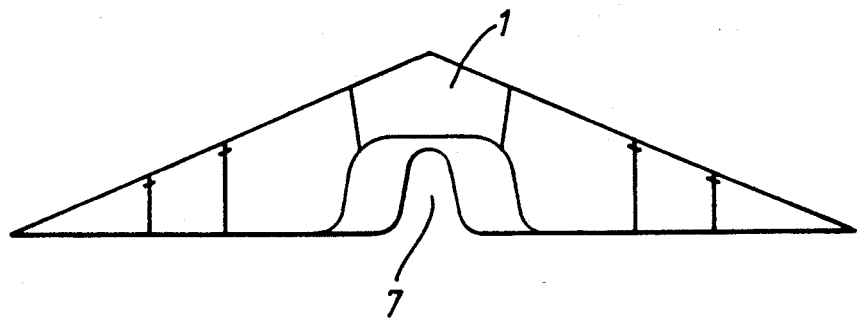
FIG. 3 shows a schematic view of the mattress of FIG. 1 being deployed over a seabed pipeline.
Figure 3:
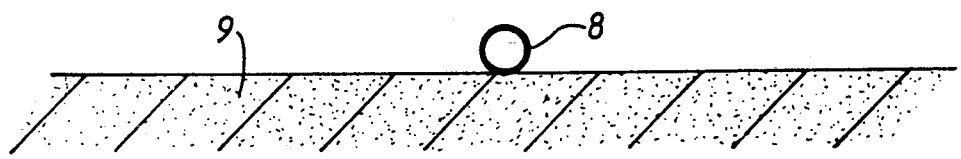

FIG. 3 shows a mattress of FIG. 1 being deployed over a seabed pipeline 8 lying on the seabed 9, showing the insulant recess 7 acting as a guide and protecting the pipeline from contact with concrete elements.

Figure 4:
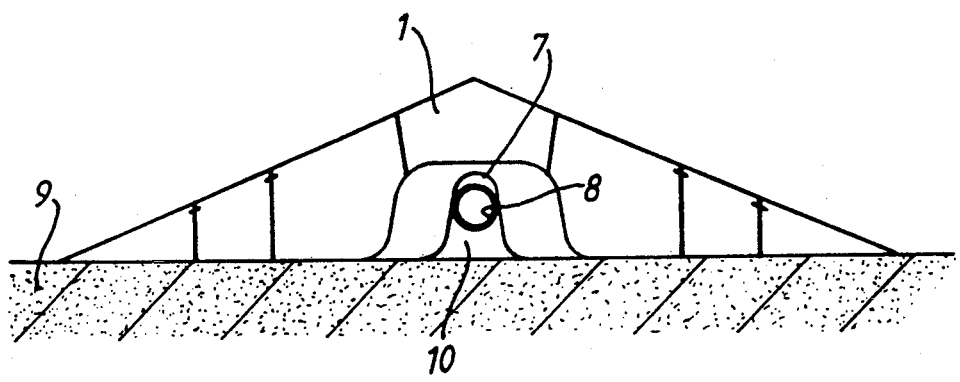
FIG. 4 shows a schematic view of the mattress of FIG. 1 in position over the seabed pipeline.

FIG. 4 shows the mattress of FIG. 1 in position over the seabed pipeline 8 such that the seafloor 9 and the insulant recess 7 trap a discrete lens of seawater 10.

Figure 5:
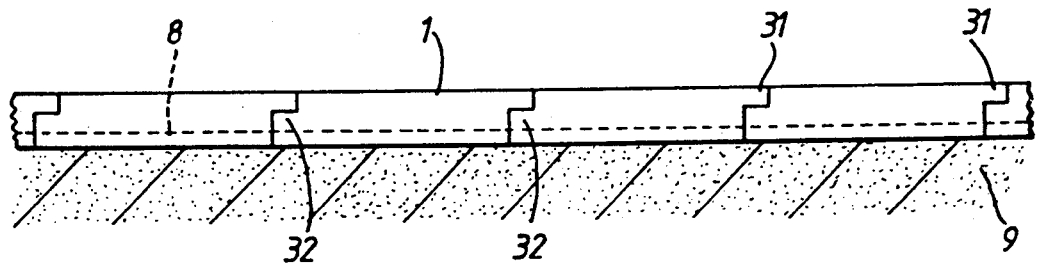
FIG. 5 shows, on a much reduced scale, a side view of a seabed pipeline with a continuous row of mattresses of FIG. 1 deployed over it showing the interlocking of the mattresses.

FIG. 5 shows a row of mattresses of FIG. 1 on the seabed 9 over a pipeline 8. The interlocking male features 31 of the central element 1 are engaged with female features 32.

Figure 6:
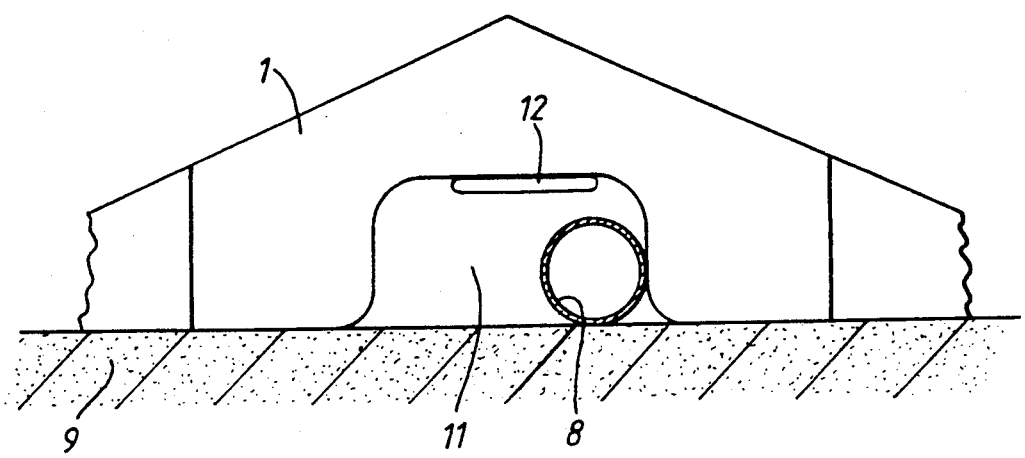
FIG. 6 shows a schematic view of the mattress shown in FIG. 4 after high temperature operation and some deflection of the pipeline.

FIG. 6 shows the mattress of FIG. 1, placed as in FIG. 4, after the pipeline has commenced operation. The action of the passage of high temperature fluids, typically 100° C., will cause the pipeline to expand axially and to seek to buckle laterally. The heat generated by the hot fluid will locally melt the insulant material such that the pipeline 8 can move virtually unrestrained to the position shown in FIG. 6.

The insulant has a specific gravity greater than seawater and thus the liquifying and solidifying cycle will cause the insulant to slump to the bottom of the tunnel 11.

The lens of seawater 12 migrates away from the pipeline to take up a position such as shown enhancing the overall insulation effect of the system. This eliminates the oxygenated seawater from the vicinity of the high temperature pipeline.

Figure 7:
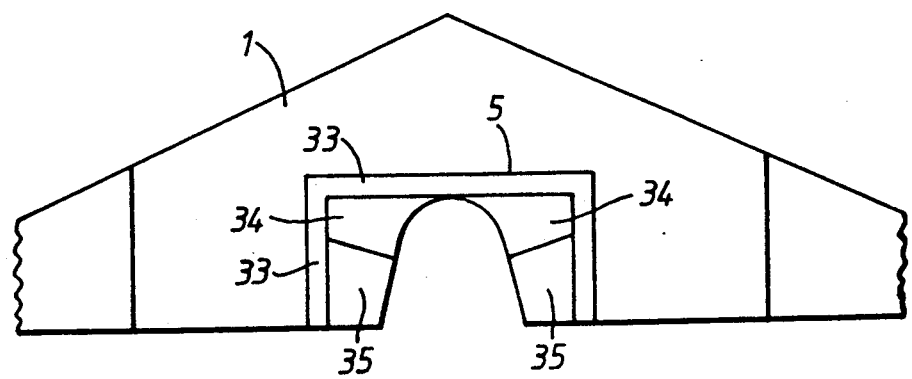
FIG. 7 shows a second embodiment of the mattress of the invention.

FIG. 7 shows a second embodiment of the invention whereby the central tunnel 5 has a number of insulant materials pre-installed therein prior to deployment. The immediate wall of the tunnel has a thickness of permanent insulant material 33 and the internal insulant is formed essentially as shown in FIG. 1 but with differing insulant materials where the upper insulant 34 has a specific gravity less than seawater (which is approximately 1.025) for example, a wax and the lower material 35 has a specific gravity greater, than seawater, for example, a bitumen-based mastic.

Figure 8:
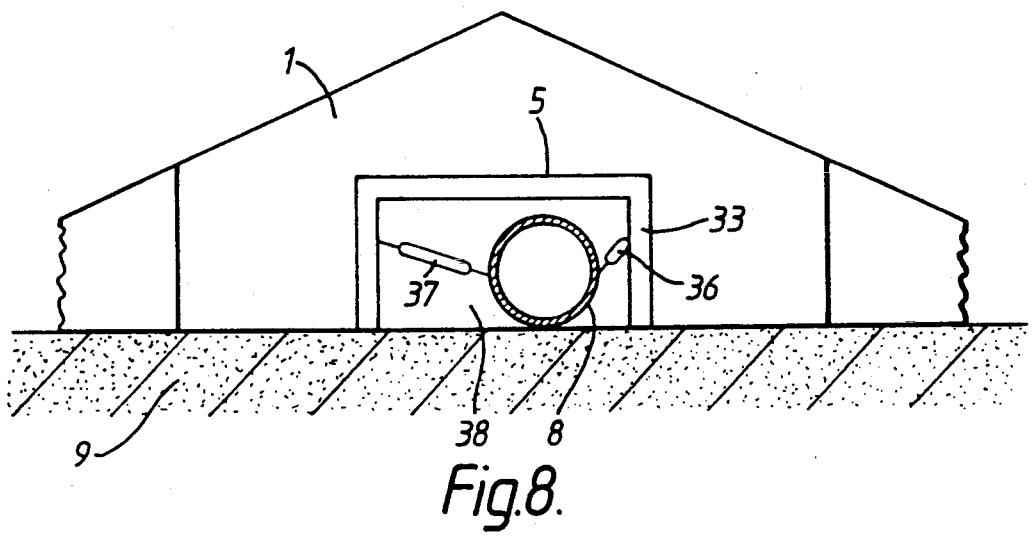
FIG. 8 shows a schematic view of the mattress shown in FIG. 6 during operation.

FIG. 8 shows the mattress of FIG. 7 placed largely as shown in FIG. 4, after the pipeline has commenced operation. The action of the high temperature fluid as shown in FIG. 6 causes the lens of seawater entrapped to migrate to locations 36 and 37 and the insulant 38 to slip and form around the pipeline 8.

Figure 9:
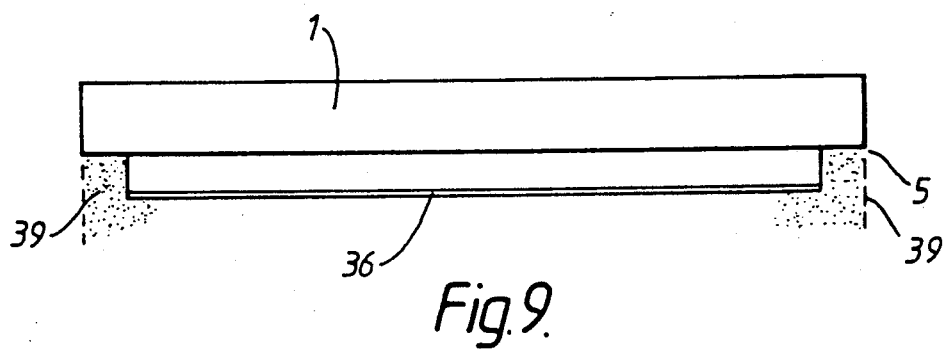
FIG. 9 shows a middle sectional view through a mattress of FIG. 6.

FIG. 9 shows a section through the central element of the mattress shown in FIG. 7. Insulant elements 39, whose specific gravity is greater than 1.025, are located at each end of the mattress so that the lens of water is trapped within the confines of a mattress element to avoid migration to adjacent mattress elements.

Figure 10:
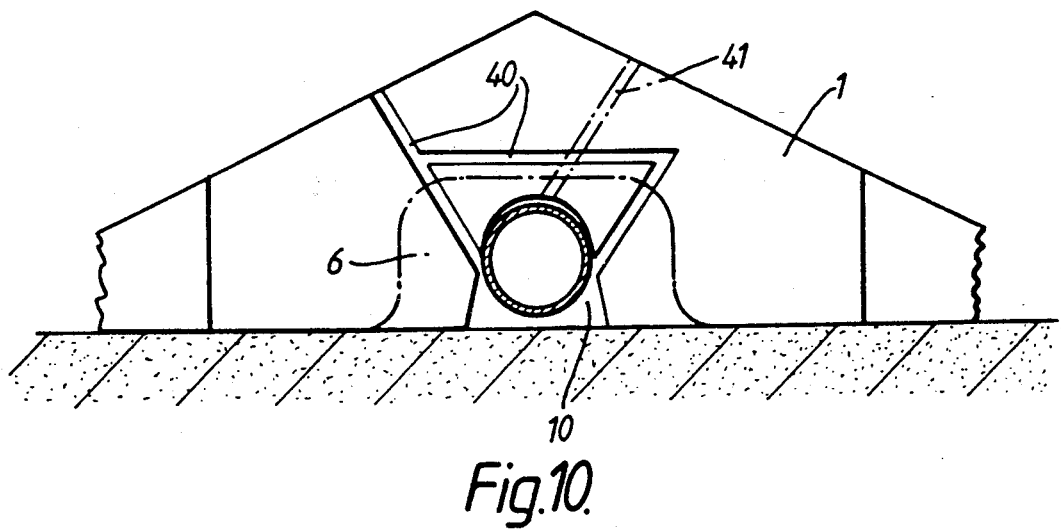
FIG. 10 is a schematic view of the mattress of FIG. 4 showing a further preferred feature.

FIG. 10 shows a mattress of FIG. 4 where one or more inlet channels 40 are provided through the central section 1 and the insulant material 6 such that further insulant material can be pumped through the channel to fill the water lens 10. A vent channel 41 is provided to allow the seawater to be displaced from the area of the water lens by the admission of this additional insulant.

Figure 11:
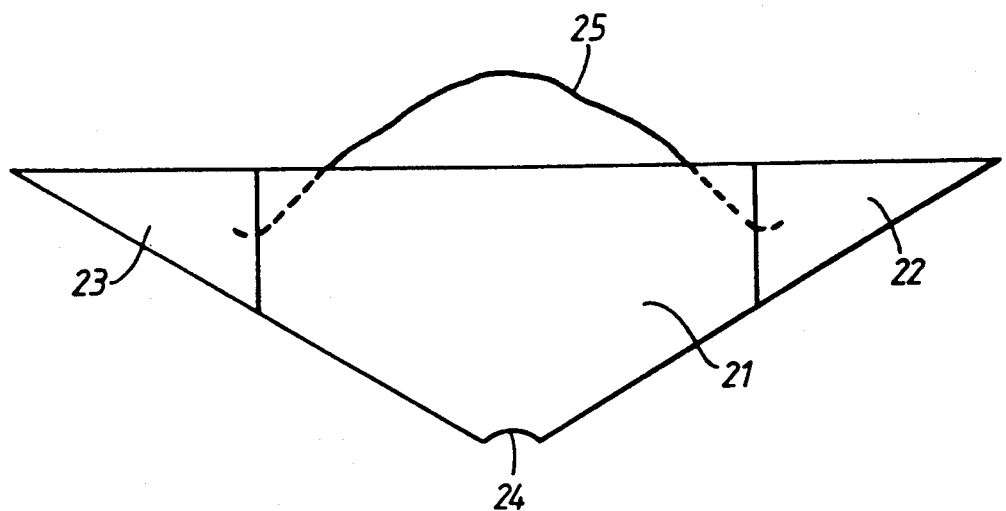
FIG. 11 shows a third embodiment of the mattress of the invention.

FIG. 11 shows a third embodiment of the mattress of the invention. The mattress consists of a structure having an inverted triangular shape defined by downwardly converging lower sides terminating at the apex of an obtuse angle, the apex and at least those portions of the lower sides adjacent the apex being in a unitary central element 21. The central element 21 has two outer elements, one on each side 22 and 23 and the apex is recessed at 24. The mattress is interconnected by rope linkage 25 which passes freely through the central element 21 and permits articulation of the elements 21, 22, 23.

Figure 12:
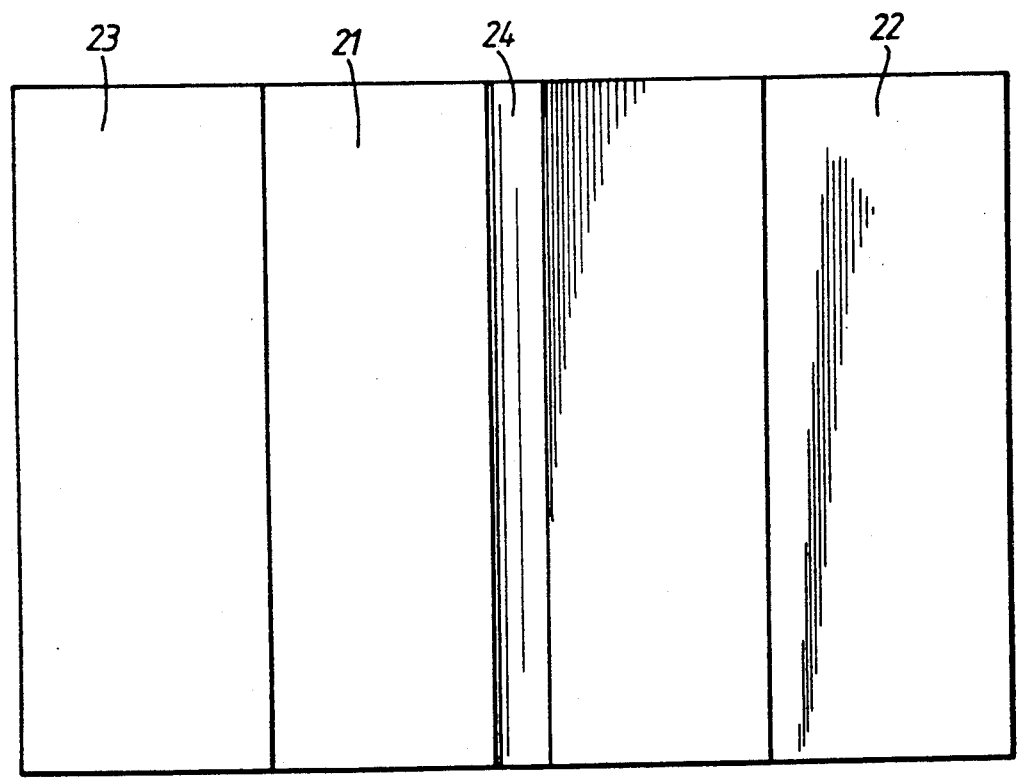
FIG. 12 shows a bottom plan view of the mattress shown in FIG. 11.

FIG. 12 shows a bottom plan of the mattress of FIG. 11, and like numerals indicate like parts.

Figure 13:
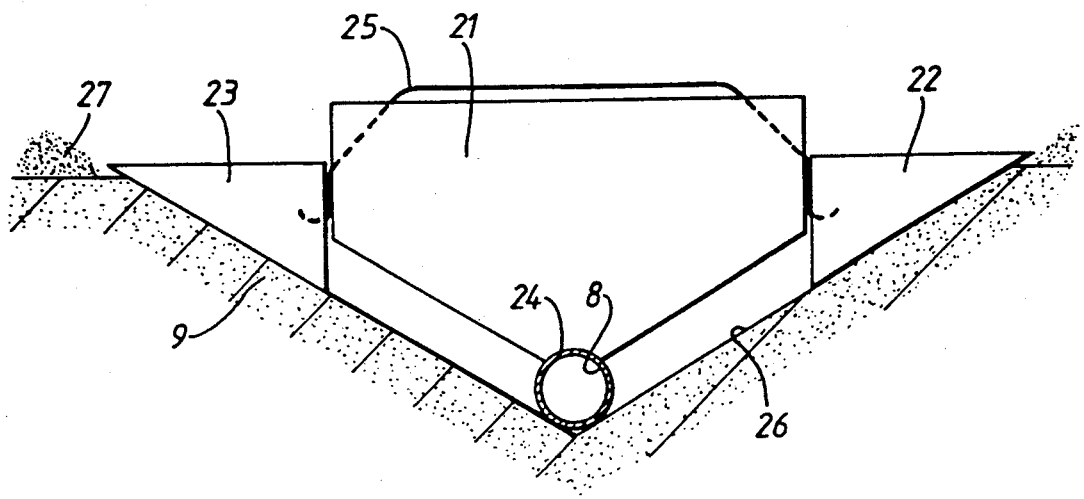
FIG. 13 shows a schematic view of the mattress of FIG. 11 deployed onto a seabed pipeline within a trench.

FIG. 13 shows the mattress of FIG. 11 in position in a trench 26 cut into the seabed 9. Typical slope angle for the trench is 301 and the depth is 1.0-1.5 metres. A spoil bank 27 often extends the side walls of the trench. The central element 21 lies in the centre of the trench with the recess 24 engaging the upper surface of the pipeline 8. The attachment rope 25 is released after deployment so that the outer elements 22 and 23 fall onto the trench side thereby supporting the central element such that all the load induced by the central element bears onto the pipeline thereby maximising the axial friction force.

Figure 14:
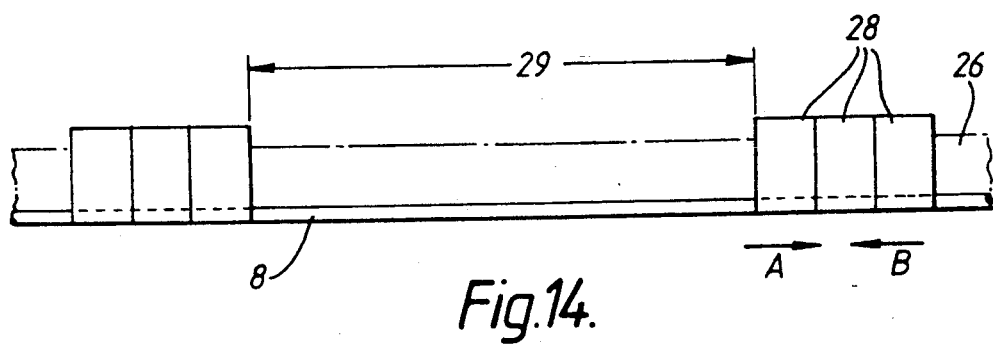
FIG. 14 shows, on a much reduced scale, a side view of the seabed pipeline and trench showing mattresses of the invention deployed at discrete intervals.

FIG. 14 shows a section of the trench with one or more such mattresses of FIG. 11 deployed at a regular interval along the pipeline 8. The thermal expansion force A generated by the hot fluid in the pipeline will be counteracted by the axial friction force B generated by the group of mattresses 28. The gap 29 between the groups and the size and number of mattresses required will depend on pipeline operational parameters.

Figure 15:
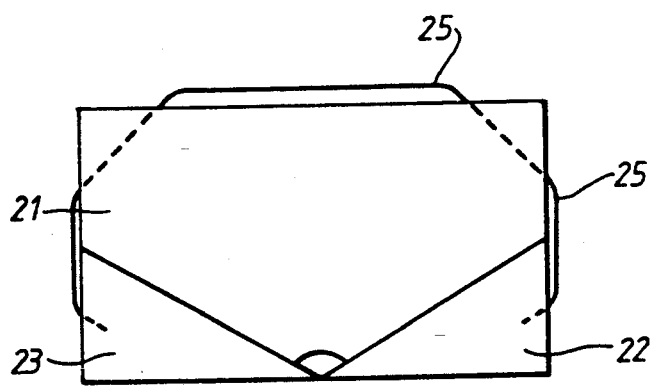
FIG. 15 shows the mattress of FIG. 11 in the folded condition for transportation.

FIG. 15 shows the mattress of FIG. 11 but in a folded condition for transport. It will be observed that the outer members 22 and 23 have been folded under the central element 21 thus making a substantially compact rectangular profiled unit which facilitates stacking for transport and storage, the linking rope 25 remaining slack in the folded configuration.

I claim:

1. An articulated mattress for laying on a seabed to cover and insulate a pipeline, said mattress comprising a plurality of elongate concrete members which are articulated together for lying on a seabed in side-by-side and generally parallel relation, said mattress including a central member comprising a unitary rigid concrete block having first and second opposed side walls, and a generally planar undersurface for engagement with the seabed, an elongate tunnel in said undersurface extending lengthwise of said central member between said side walls, and a first insulate material installed in said tunnel prior to deployment of said mattress over a pipeline, said insulant being constructed and arranged to cover and insulate a previously laid pipeline as said mattress is deployed over said pipeline.

2. A mattress according to claim 1, wherein said first insulant material is such that, when said mattress and insulant have been laid over said pipeline, said insulant will soften or liquefy as it warms in response to heated fluid flowing in said pipeline.

3. A mattress according to claim 2, wherein said first insulant material is selected from the group consisting of wax, bituminous material, and a thermoplastic resin.

4. A mattress according to claim 1 or 2, wherein said first insulant material has a specific gravity greater than that of seawater.

5. A mattress according to claim 4, additionally comprising a second insulant material within said tunnel, the second insulant material having a specific gravity less than that of seawater.

6. A seabed stabilization mattress comprising a structure of concrete or the like which in cross section is of generally triangular shape having downwardly converging lower sides terminating in an apex of an obtuse angle, at least those portions of said sides adjacent said apex being parts of a unitary element of said structure, said apex being recessed to seat on a pipeline in a trench with said sides of said structure engaging, at least in part, the sides of said trench.

7. A mattress according to claim 6, wherein said recess is shaped to engage the pipeline along the whole mattress length.

8. A mattress according to claim 6 or 7, wherein said structure comprises a plurality of elements of concrete or the like articulated together.

9. A mattress according to claim 8, wherein said structure is of generally isosceles shape, and wherein said elements comprise a central element and two outer elements, each of the outer elements having a right-angled triangular cross-section with its hypotenuse defining a part of a downwardly converging lower side of said structure.

* * * * *